(12) United States Patent
Stahl

(10) Patent No.: US 11,724,771 B2
(45) Date of Patent: Aug. 15, 2023

(54) METHOD AND DEVICE FOR DYNAMICALLY CONTROLLING A RANGE OF AN ELECTRICALLY-ASSISTED BICYCLE, ELECTRICALLY-ASSISTED BICYCLE

(71) Applicant: TQ-Systems GmbH, Seefeld (DE)

(72) Inventor: Rüdiger Stahl, Seefeld (DE)

(73) Assignee: TQ-Systems GmbH

( * ) Notice: Subject to any disclaimer, the term of this patent is extended or adjusted under 35 U.S.C. 154(b) by 313 days.

(21) Appl. No.: 17/279,516

(22) PCT Filed: Sep. 26, 2019

(86) PCT No.: PCT/IB2019/058153
§ 371 (c)(1),
(2) Date: Mar. 24, 2021

(87) PCT Pub. No.: WO2020/121074
PCT Pub. Date: Jun. 18, 2020

(65) Prior Publication Data
US 2021/0394863 A1    Dec. 23, 2021

(30) Foreign Application Priority Data

Sep. 26, 2018  (GB) ...................................... 1815666
Feb. 22, 2019  (GB) ...................................... 1902411

(51) Int. Cl.
B62M 6/50         (2010.01)
(52) U.S. Cl.
CPC ..................................... B62M 6/50 (2013.01)
(58) Field of Classification Search
CPC ..................................................... B62M 6/50
See application file for complete search history.

(56) References Cited

U.S. PATENT DOCUMENTS 9,409,622 B2    8/2016   Gros et al.
2002/0120382 A1*  8/2002   Hatanaka ................ B60L 50/51
                                                      180/220

(Continued)

FOREIGN PATENT DOCUMENTS

CN        104062588           6/2017
EP        2918490 A1 *  9/2015   ............ B60L 3/0023

(Continued)

OTHER PUBLICATIONS

TQ-Systems GMBH; Office Action for Chinese patent application No. 201980063514.2, dated Apr. 6, 2022, 9 pgs.

(Continued)

Primary Examiner — Tony H Winner
(74) Attorney, Agent, or Firm — Taylor English Duma LLP

(57) ABSTRACT

Method and device for dynamically controlling a range of an electrically-assisted bicycle comprising an energy storage and an electric motor, wherein the method is calculating a route from the current bicycle location to the target location, dividing the calculated route into at least two segments, calculating, for each of the at least two segments, an amount of energy to be provided to the electric motor such that an energy threshold of the energy storage is maintained for the at least two segments under consideration of an environmental value and a currently available charge of the energy storage and calculating an assistance factor therefrom according to which energy is provided to the electric motor during the first segment and wherein the amount of energy to be provided to the electric motor and the assistance factor is recalculated for the second segment if an amount of energy consumed during the first segment exceeds a predetermined deviation threshold.

20 Claims, 4 Drawing Sheets

(56) References Cited

U.S. PATENT DOCUMENTS

2017/0183057 A1* 6/2017 Gibbings ............... B62K 19/40
2018/0251190 A1   9/2018 Hancock et al.
2019/0185106 A1* 6/2019 Lin ......................... B62M 6/65

FOREIGN PATENT DOCUMENTS

| JP | 2005271613 | 10/2005 | |
|----|----|----|----|
| WO | WO-2006029524 A1 * | 3/2006 | ......... A61K 2300/00 |
| WO | WO-2011154657 A1 * | 12/2011 | ............. B62M 6/45 |
| WO | 2015154046 | 10/2015 | |
| WO | 2017085579 | 5/2017 | |

OTHER PUBLICATIONS

TQ-Systems GMBH; Office Action for Chinese patent application No. 201980063514.2, dated Dec. 5, 2022, 19 pgs.
Stahl, Rudiger; International Search Report and Written Opinion for PCT/IB2019/058153, filed Sep. 26, 2019, dated Dec. 3, 2019, 9 pgs.

* cited by examiner

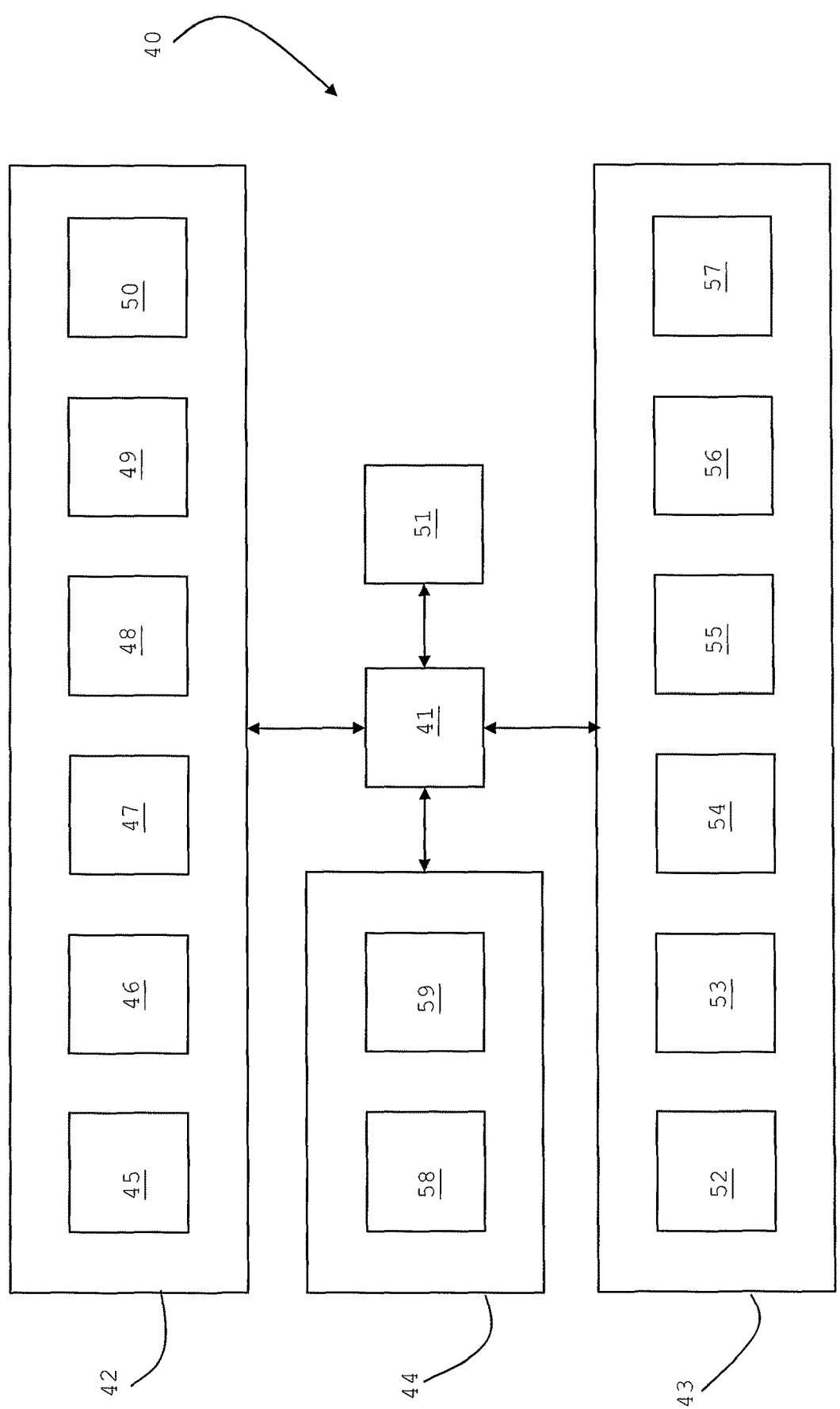

METHOD AND DEVICE FOR DYNAMICALLY CONTROLLING A RANGE OF AN ELECTRICALLY-ASSISTED BICYCLE, ELECTRICALLY-ASSISTED BICYCLE

Method and device for dynamically controlling a range of an electrically-assisted bicycle, electrically-assisted bicycle The present invention relates to a method and device for dynamically controlling a range of an electrically-assisted bicycle comprising an energy storage and an electric motor. The invention further relates to an electrically-assisted bicycle.

An electrically-assisted bicycle is a bicycle that comprises an electric motor to support or assist the driver and an energy storage, which stores energy to be provided in the form of electrical energy to the electric motor. The electric motor can, for example, be a hub motor or a chain motor, comprising at least one DC or AC powered electrical machine. The energy storage can, for example, be a battery or an accumulator, for example a lead, or lithium-based battery or accumulator. Alternatively, or additionally, the energy storage can be a fuel-cell storage. The electric motor provides energy in addition to human muscle power of the driver pedalling the bicycle with an assistance factor. An example for such an electrically-assisted bicycle is in particular an electric bicycle, such as an e-bike or pedelec.

Methods and devices for controlling a range of such an electrically-assisted bicycle are commonly known in the art. It is thus an object to provide an improved method and device for this purpose.

According to one aspect of the application, a method for dynamically controlling a range of an electrically-assisted bicycle is provided. The method has the particular advantage that it is able to control the range of an electrically assisted bicycle in a way such that an energy storage can provide energy to electric motor of the electrically-assisted until a desired location is reached, without running out of energy.

The method according to the application first comprises the steps of determining a current bicycle location, determining a target location and calculating a route from the current bicycle location to the target location.

The method further comprises the steps of determining a currently available charge of the energy storage at the current location, determining an environmental value indicating at least one environmental condition for the calculated route and dividing the calculated route into at least two segments.

The method further comprises the steps of calculating, for each of the at least two segments, an amount of energy to be provided to the electric motor such that an energy threshold of the energy storage is maintained for the at least two segments under consideration of the environmental value and the currently available charge of the energy storage, calculating, for each of the at least two segments, an assistance factor based on the calculated amount of energy and providing energy to the electric motor during the first segment according to the calculated assistance factor.

The method, after completing the first segment, further comprises the steps of determining the currently available charge of the energy storage at the current location and comparing an amount of energy consumed during the first segment with the calculated amount of energy during the first segment.

If the comparison exceeds a predetermined deviation threshold, the method further comprises storing the deviation in a correction value.

The method further comprises the steps of recalculating the amount of energy to be provided to the electric motor such that an energy threshold of the energy storage is maintained for the second segment under consideration of the environmental value, the currently available charge of the energy storage and the correction value, recalculating the assistance factor based on the recalculated amount of energy for the second segment and providing energy to the electric motor during the second segment according to the recalculated assistance factor.

In the first step of the method, the current bicycle location is determined. This can be performed either through means of a position or location sensor, as for example GPS, or by receiving a location, such as a street name, an address or coordinates from a user of the bicycle, for example through a user interface, comprising an output device, such as a display and/or a speaker, and an input device, such as a touch-pad, touchscreen and/or keyboard. The current bicycle location in this step can also be named a starting point.

Thereafter, the target location the user desires to travel to is determined. This can for example be performed by receiving a location, such as a street name, an address or coordinates from the user, for example through the user interface. The target location can also be named destination or arrival point.

As the next step, at least one route is calculated from the previously determined bicycle location to the previously determined target location. The route can also be named itinerary. This can for example be executed by a processor being disposed within the user interface or connected therewith, based on map or navigation data being stored in a map database.

In a next step the charge of the energy storage, which corresponds to the available electrical energy stored in the energy storage of the bicycle at the current location is determined. A charge of the energy storage, which can also be described as the electric charge, is measured in Ah. A charge is the actual content of the energy storage. The available charge is different from the nominal or actual capacity of the energy storage, which is subject to deterioration and age. The capacity of the energy storage is the potential electrical charge content, which can also be described as the maximum or actual capacity. The actual capacity of an energy storage can, for example, be determined together or simultaneously with the determination of the charge of the energy storage. Therefore, a characteristic curve of an output voltage of the energy storage is determined as a function of the current, which can be either a charging current or a discharging current, and the amount of energy provided or supplied therethrough. The actual capacity of the energy storage results from the integral of the product of voltage and current over the time up to a predetermined or predefined final discharge voltage, which must not be undercut.

Alternatively, or additionally, the actual capacity can be determined by fully charging an energy storage and then fully discharging the energy storage while the current being discharged from the energy storage is measured or counted. If, for example, an energy storage, after being fully charged, delivers a current of 1 A over the time of 4 hours, the maximum capacity of the energy storage is 4000 mAh. The maximum capacity of the energy storage can also be determined by collecting multiple currently available charge measurements through a voltage measurement during a charge and in parallel collecting the same measurements through a balance measurement during a charge. If, for example, the voltage measurement yields that during a charge 1000 mAh should be charged to the energy storage but the balance measurement yields that only 800 mAh have been charged to the energy storage, this indicates that the energy storage is deteriorated and the maximum capacity is less than the nominal capacity. By iterating this balance measurement together with the voltage measurement, a very precise actual maximum capacity can be determined.

The determination of the currently available charge can for example be performed through a voltage measurement, a resistance measurement or a conductance measurement of the energy storage, for example regarding the actual current. A voltage measurement can, for example, derive the currently available charge of an energy storage from the voltage that the energy storage can currently deliver. For example, a measured voltage of 47.5 V of an energy storage with a nominal voltage of 48 V may yield that the currently available charge of the energy storage is 50% of the maximum capacity of the energy storage, which might be nominal of 2000 mAh, while a measured voltage of 47.2 V of the same energy storage may yield that the currently available charge equals 30% of the maximum capacity of the same energy storage. A voltage measurement is particularly precise for a partly charged or discharged energy storage. Alternatively, or additionally, the determination of the currently available charge can be performed by accessing a management device being incorporated into or attached to the energy storage.

The currently available charge can also be calculated through a balance measurement, i.e. by counting, for example through a charge counter or charge meter, the current that has been delivered during a partial or a full charge to the energy storage and by then integrating this current over the charge time. If, for example, a charge current of 1 A has been delivered to the energy storage over the time of 1 hour, the currently available charge is 1000 mAh higher than before charging. The balance measurement is particularly precise if the energy storage is close or near to fully charged and/or close or near to empty.

For the method it is particularly helpful, if the actual maximum capacity of the energy storage is known, which is why each charging cycles can be monitored as described above through a voltage measurement and a balance measurement and a precise actual capacity of the energy storage is determined. Through a precisely determined actual capacity, the currently available charge can be determined more precisely when using only the voltage measurement, as the currently available charge can then be subject to the actual capacity of the energy storage and not the nominal capacity, which might be deteriorated.

Then, an environmental value is determined, wherein the environmental value indicates at least one environmental condition for the calculated route. An environmental condition can for example be a distance, a height, an altitude, an elevation, an ascent and/or a slope of the road to travel on. An environmental condition can be a topographic profile of the route. An environmental condition can also be a number of bends or curves along the route, in particular the angles of the bends or curves or the number of straights and their length(s). An environmental condition can additionally be a wind speed and/or wind direction, for example if there are headwinds or tailwinds along the road to travel on. An environmental condition can also be a condition of the road to travel on, such as, for example, whether the road is made from asphalt, gravel, sand or earth or if it is an off-road or cross-country route. This condition or conditions can be stored for example in an environmental database the processor has access to.

In a further step, the calculated route is divided into at least two segments. This step can also be performed by the processor. The route can be divided, for example, into two equally long segments. For example, if the total route is 10 km, the first segment and the second segment can be each 5 km long. The route can also be calculated into more than two segments of equal length or of a fixed or constant length. For a route of 10 km, the route can be divided into five segments of 2 km or ten segments of 1 km. The segments can also be divided according to other principles, for example according to the slope along the routes.

The method further comprises the steps of calculating, for each of the at least two segments, an amount of energy to be provided to the electric motor such that an energy threshold of the energy storage is maintained for the at least two segments under consideration of the environmental value and the currently available charge of the energy storage and providing the calculated amount of energy to the electric motor during the first segment.

For example, if the currently available charge of the energy storage equals to 30 Ah and the electric motor is powered by 30 V from the energy storage on overage over time, this equals to a potentially available energy of 30 Ah*30 V=900 Wh. If further the energy threshold equals to 5 Ah or 150 Wh, then the amount of energy to be calculated for all segments, in this case two segments, is 750 Wh. When taking into account the environmental value, which shows that for example the first segment of 5 km has a steep positive, i.e. rising slope, and the second segment of 5 km has a steep negative, i.e. a descending slope, then, naturally, it would require more energy to travel the first segment than to travel the second segment. In this case, the calculated energy for the first segment would be greater than half of the whole currently available energy, i.e. greater than 375 Wh, like, for example 600 Wh, and the calculated energy for the second segment would be smaller than 375 Wh, like, for example 150 Wh.

Based on this outcome in a further step, an assistance factor is calculated for each of the at least two segments and energy is provided to the electric motor during the first segment according to the calculated assistance factor. An assistance factor is a factor of how much energy or power will be provided in addition to the human muscle power being provided by the user. For example, if the user provides 100 Watts of power and there is an assistance factor of 1.5, the electric power provided to the electric motor would be an additional 150 Watts.

The calculation can, for example, take into account an average or maximum travel time, for example based on an average speed, for the segment. For example, if the segment is 1 km long and the average traveling speed is 15 km/h, the time to travel would equal 4 min for this segment. For an exemplary calculated amount of energy of 10 Wh for the segment of 1 km, an average power supply of 150 Watts can be provided. Further, for an average traveling speed of 15 km/h, it may be known that 250 Watts need to be applied to the bicycle. Therefore, the user will provide 100 Watts of human muscle power on average and the assistance factor is calculated to be 1.5 in this example. In another example, if the segment is 5 km long and the average travel speed is 30 km/h, the time to travel would be equal to 10 min. For an exemplary calculated amount of energy of 10 Wh for the segment of 5 km, an average power supply of 60 Watts can be provided. Further, for an average traveling speed of 30 km/h, it may be known that 360 Watts need to be applied to the bicycle on average. Therefore, the user will provide 300 Watts of human muscle power on average and the assistance factor is calculated to be 0.2 in this example. The power necessary to achieve a certain average speed can be dependent on one or more environmental values, for example a wind value, as discussed above.

The calculation can, in another example, take into account an average user power contribution. For example, an average user power contribution may be 100 Watts of human muscle power. For an exemplary calculated amount of energy of 10 Wh for the segment of 1 km, a travel time is given by t=s/v, wherein t is the travel time, v is the average traveling speed, and s is the segment length. Further, the average assistance power is given by p=E/t, wherein p is the average assistance power, and E is the calculated amount of energy, which is 10 Wh in this example. Therefore, the average assistance power is given by p=E*v/s, wherein p is the average assistance power, and E is the calculated amount of energy, v is the average travel speed, and s is the segment length. At the same time, the average assistance power is given by p=R*v2−p0, wherein p is the average assistance power, R is a friction factor, v is the average traveling speed, and p0 is the average user power contribution. Therefore, an average travel speed may be calculated by solving E*v/s−R*v2+p0=0 for v. For a calculated amount of energy of 10 Wh, a segment length of 1 km, an exemplary friction factor R of 1, and an exemplary average user power contribution p0 of 100 W, an average traveling speed of 11.05 km/h is calculated. Hence, an average assistance power p is calculated by solving p=E*v/s. Therefore, the average assistance power p in this example is calculated to be 110.5 W. Therefore, given the average user power contribution of 100 W of human muscle power, the assistance factor is calculated to be 1.1105. More detailed calculations, which may for example take into account dynamic changes in speed, may be applied to calculate a more accurate assistance factor.

Calculating an assistance factor based on the calculated amount of energy can be performed by determining an assistance factor corresponding to the calculated amount of energy in an assistance value, comprising at least one assistance condition. The assistance condition may be based on one or more of an average traveling speed, an average user power contribution, a user preference or an environmental value. Therein, the assistance condition may be generated using one of the calculation methods described above, similar calculations, calibration based on empiric data, or a combination of any of these. The average values as indicated above may also be stored in a database.

The method further comprises, after completing the first segment, the steps of determining the currently available charge of the energy storage at the current location and comparing an amount of energy consumed during the first segment with the calculated amount of energy during the first segment. In this step, the currently available charge of the energy storage is re-determined according to the same principles as in the first place and used as a basis to determine the energy actually consumed during the first segment. For the above example, the total energy to be provided to the electric motor has been calculated to be 600 Wh. If the remaining energy in the energy storage after the first segment is 200 Wh instead of 300 Wh, then, it can be calculated that the consumed energy in the first segment was higher, i.e. 100 Wh higher than previously calculated, i.e. 700 Wh.

If the comparison of 600 Wh as previously calculated versus 700 Wh as currently calculated exceeds a predetermined deviation threshold, as for example 5 Wh or 10 Wh, the method further comprises storing the deviation in a correction value. This positive deviation, in this example of +100 Wh or +3.3 Ah is an indicator that the previous calculation under consideration of the environmental value was to some extend faulty or erroneous. This might be, for example, because the map or navigation data is outdated, and the precalculated road makes a detour, such that the predetermined segment is longer than calculated. This can also be because there is an obstruction or a construction site on the way or route such that a user has to slow down or come to a complete stand-still. This can further be due to a user condition or behaviour, for example if the user tends to have an aggressive and unsteady driving style and uses to brake and reaccelerate a lot, which consumes more energy, in particular on a steep increasing slope.

In another example, if the remaining energy in the energy storage after the first segment is 400 Wh instead of 300 Wh, then, it can be calculated that the consumed energy in the first segment was lower, i.e. 100 Wh lower than previously calculated, i.e. only 500 Wh. Then, if the comparison of 600 Wh as previously calculated versus 500 Wh as currently calculated exceeds a predetermined deviation threshold, as for example 5 Wh or 10 Wh, the method further comprises storing the deviation in a correction value. This deviation, in this example of −100 Wh or −3.3 Ah is an indicator that the previous calculation under consideration of the environmental condition was to some extend faulty or erroneous. This might be, for example, because the map or navigation data is outdated, and the precalculated road makes a shortcut, such that the predetermined segment is shorter than calculated. This can further be due to a user condition or behaviour, for example if the user tends to have very steady and foresightful driving style and tends to brake and accelerates less or more carefully.

If the deviation of the actually consumed energy in the first segment from the previously calculated energy exceeds a consumption threshold, then the correction value can not fully reflect the deviation but only part of it and the remainder can be considered during a further segment. For example, if the consumption threshold would yield a correction value of more than 10%, the correction value can be capped at 10% and the remainder can be added to the correction value being determined in the following segment, if any.

The method further comprises the steps of recalculating the amount of energy to be provided to the electric motor such that an energy threshold of the energy storage is maintained for the second segment under consideration of the environmental value, the currently available charge of the energy storage and the correction value. Then, the assistance factor based on the recalculated amount of energy for the second segment in a similar fashion as explained above for the calculation. If the comparison result yields that the same or a similar amount of energy has been consumed as previously calculated the steps of recalculating can be omitted. Then, the energy to the electric motor during the second segment is provided according to the recalculated assistance factor.

For the second segment, not only is it taken into account that the remaining energy in the energy storage is actually less or more than previously calculated but also the correction factor is taken into account. For example, if the user is an aggressive driver, who brakes and reaccelerates a lot, then the energy to be provided to the electric motor can be less than previously calculated. In this example, if the user has already consumed 100 Wh more than previously calculated then, under consideration of a threshold of 150 Wh, only 200

Wh instead of 300 Wh would be available to the electric motor in the second segment.

Now taking into account the user behaviour, it is calculated under consideration of the correction factor, that even less energy should be provided to the electric motor. In this case, this would result in 150 Wh being available to the electric motor in the second segment instead of 200 Wh.

Based on this result, the assistance factor is then recalculated. For example, if the assistance factor was being calculated as 1.5 for the second segment during the first calculation, the user has however consumed more energy, the assistance factor will be reduced to 1.25 during the second segment.

Through this solution it is possible to adapt the energy consumption not only to environmental conditions as previously stored in a database, which in addition might be outdated, but also to user behaviour, in particular user driving behaviour. Thereby, it is possible to train and learn for the electrically-assisted bicycle a correction value, which can be used the next time a new route is starts. If, for example, from previous routes there is already a correction value stored, the correction value can be considered when calculating the energy to be provided for the whole route, i.e. before starting the first segment. Through this solution, a particular precise calculation of the energy to be provided to the electric motor.

The method can be improved by further comprising the steps of providing a user threshold request to a user to define the energy threshold of the energy storage, receiving user threshold input in response to the user threshold request and applying the user threshold input to the energy threshold.

The user threshold equals to the desired remaining energy after finishing the at least two segments. The user threshold request can be displayed on the user interface. Therein, the user can be requested to enter a desired energy threshold. Further, selectable options can be displayed to the user to select from, for example 50 Wh, 100 Wh or fractions of what the energy that is currently available in the energy storage, either in percent or absolute values. Thereafter, a user threshold input is received, for example by the user selecting on the touchscreen an available option or by entering a desired value, for example through the keyboard. After the user input, this user-selected entered value is used when in future steps of the method the energy threshold is required or used. This step is performed before the step of calculating and/or recalculating the amount of energy to be provided to the electric motor.

Thereby, the user can freely select what energy threshold should be maintained in the energy storage. For example, the user can define that he wants to consume only so much energy that, for example, after the whole trip at least 50% or 50% plus a buffer of 5% or 10% of the energy storage is still available so that he can return on the same route in the same way, i.e. with the same assistance of the electric motor.

This method provides a particular flexible user interaction.

The method can be further improved by comprising the steps of providing a user segment request to a user to define the at least two segments, receiving user segment input in response to the user segment request and applying the user segment input to the at least two segments.

The user segment request can be displayed on the user interface, for example in a graphical representation of the at least two segments and their individual parts of the route. Therein, the user can be requested to enter a desired length of the first and/or second segment. Further, selectable options can be displayed to the user to select from, for example, fractions of the total route, either in percent or absolute values. In line with the display of the route there can be displayed individual and/or available environmental condition(s), such as slope, length, weather, etc. Thereafter, a user segment input is received, for example by the user selecting on the touchscreen an available option or by entering a desired value through the keyboard. After the user input, this user-selected entered value is used when in future steps of the method the at least two segments are required or used. This step is performed together, instead of or immediately before or after the step of diving the calculated route.

Thereby, the user can freely select and divide the route into as many individual segments as he desires. For example, the user can define that the route should be divided into more and shorter segments so that the correction value is more precise. On the other hand, the user can individually assign varying lengths of the segment, such that a long downhill stretch is not monitored as closely with regard to the correction value, but a short uphill stretch is.

This has the advantage that a user can adjust the segment(s) to be recalculated with regard to the correction value particularly well.

The method can be further improved in that the step of calculating a route comprises calculating two alternative routes and wherein the method further comprises the steps of providing a user route request to a user to select a route out of the two alternative routes, receiving user route input in response to the user route request and applying the user route input to the route.

The user route request can be displayed on the user interface, for example in a graphical representation of the two alternative routes, for example including their individual segments. Therein, the user can be requested to select a desired route out of the two available routes. In line with the display of the route there can be displayed individual and/or available environmental condition or conditions, such as slope, length of the route, weather, etc. Additionally, the currently available charge of the energy storage may be determined or redetermined and displayed. Thereafter, a user route input is received, for example by the user selecting on the touchscreen an available option or by entering a desired value through the keyboard. After the user input, this user-selected route is used when in future steps of the method the calculated route is required or used.

Thereby, the user can freely select one route option out of two possible routes to his target. Thereby, the user may for example select, in particular depending on the available energy of the energy storage, a first route that is longer but has less slope such that less energy is consumed or select a second route that has a higher slope but is shorter and thus quicker.

This has the advantage that the user can chose between different routes depending on his preferences and/or environmental condition or conditions.

The method can be further improved by comprising the step of determining a user value indicating at least one condition of the user and wherein the steps of recalculating the amount of energy to be provided to the electric motor also comprises recalculating the amount of energy to be provided to the electric motor under consideration of the user value.

A user value can, for example be, a height or a weight of the user. The weight can, for example, be determined through a weight sensor in the saddle and/or the pedals. Additionally, or alternatively, there may be provided a user value request to the user on the user interface. There, the user can enter his height or weight. Additionally, or alternatively, the user can also enter his fitness condition or his training level. This value or values can be stored for example in a user database.

Then, this user value is used to recalculate the amount to be provided to the electric motor. Additionally, or alternatively, the step of calculating the amount to be provided to the electric motor can also comprise calculating the amount of energy to be provided to the electric motor under consideration of the user value.

Thereby, it is possible to take a user condition into account when calculating and/or recalculating the amount of energy to be provided to the electric motor. For example, if the user is very heavy or tall, it can be determined that the user requires more energy, for example to climb up a slope, due to his weight or his drag. Alternatively, if a user is very fit, it can be determined that the user requires less energy. A lesser consumption of energy than previously determined can also occur if a power output of the electric motor is reduced because the user has reached a maximum allowed speed or a maximum allowed power output of the electric motor through his pedalling with his own muscle power.

This has the advantage that the energy to be provided to the electric motor can be calculated very precisely.

The method can be further improved by comprising the step of determining a bicycle value indicating at least one condition of the bicycle and wherein the steps of recalculating the amount of energy to be provided to the electric motor also comprises recalculating the amount of energy to be provided to the electric motor under consideration of the bicycle value.

A condition of the bicycle can for example be at least one tire of the bicycle that is lacking air and thus creates a higher friction, which results in more energy to be consumed. This can be determined, for example, with a tire pressure sensor. A further condition of the bicycle can be a malfunction of brakes or gearshift, such that more energy is consumed. A condition of the bicycle can also be a condition of the energy storage, as for example an age or how many charge cycles have been carried out with the energy storage. Further, a condition of the bicycle can also be a wear and tear of the bicycle, in particular of the driving means such as the motor and the crank. This condition can for example take into account an increased friction of the driving components, for example due to a lack of lubrication. A further condition of the bicycle can be, for example, a drag of the bicycle due to its setup, i.e. ride height, handle height, etc.

This condition or conditions can be stored for example in a bicycle database. Therein, every condition of the bicycle can be stored together with other values, features or conditions. For example, the drag or friction condition can be stored together with a driving speed or velocity, as it increases with the speed.

Then, this bicycle value is used to recalculate the amount to be provided to the electric motor. Additionally, or alternatively, the step of calculating the amount to be provided to the electric motor can also comprise calculating the amount of energy to be provided to the electric motor under consideration of the bicycle value.

This has the advantage that a condition of the bicycle unknown or unchangeable to the user is also taken into account and that the energy to be provided to the electric motor can be calculated very precisely.

The method can be further improved by comprising the step of determining a battery value indicating at least one condition of the energy storage and wherein the steps of recalculating the amount of energy to be provided to the electric motor also comprises recalculating the amount of energy to be provided to the electric motor under consideration of the battery value.

A condition of the energy storage can be for example a current temperature, an age or a deterioration of the energy storage and in particular a maximum charge of the energy storage achievable under the current temperature, age or deterioration. A current temperature of the energy storage can for example be determined through a temperature sensor being attached to or located in the near of the energy storage. An age of the energy storage can for example be determined through a production date being stored in a memory or a counter counting the time the energy storage is installed into the electrically-assisted bicycle. A deterioration of the energy storage can be determined for example by comparing previous measurements of a charge, in particular after the energy storage has been fully charged.

This condition or conditions can be stored for example in a battery database. Therein, every condition of the energy storage can be stored together with other values, features or conditions. For example, the charge of the energy storage can be stored for one or multiple temperatures, ages or deterioration statuses of the energy storage. For example, for a temperature of 20° C., the maximum charge can be 1000 mAh, and for a temperature of 30° C., the maximum charge can be 900 mAh. For an energy storage being 2 months in use, the maximum charge can be 1200 mAh and for an energy storage being 24 months old the maximum charge can be 800 mAh.

Then, this battery value is used to recalculate the amount of energy to be provided to the electric motor. Additionally, or alternatively, the step of calculating the amount to be provided to the electric motor can also comprise calculating the amount of energy to be provided to the electric motor under consideration of the battery value.

This has the advantage that a condition of the energy storage unknown or unchangeable to the user is also taken into account and that the energy to be provided to the electric motor can be calculated very precisely.

The method can be further improved in that the step of storing the deviation value in a correction value also comprises determining a user value and/or a bicycle value and/or a battery value and storing the user value and/or bicycle value and/or the battery value in the correction value.

Thereby, it is possible to associate a certain user condition and/or bicycle condition with the correction value so that, if the same or a similar user and/or bicycle condition occurs, this can be taken into account when (re-)calculating the energy to be provided to the electric motor. The correction value or values can be stored together with the conditions in a correction database.

According to a further aspect, a device for dynamically controlling a range of an electrically-assisted bicycle is provided, the bicycle comprising an energy storage and an electric motor, the device comprising a location determining unit configured to determine a current bicycle location, a target determining unit configured to determine a target location, a route calculation unit configured to calculate a route from the current bicycle location to the target location and a user interface configured to display information to a user.

The device further comprises an energy determining unit configured to determine a currently available charge of the energy storage at the current location, an environment determining unit configured to determine an environmental value indicating at least one environmental condition for the calculated route and a segment unit configured to divide the calculated route into at least two segments.

The device further comprises an energy calculation unit configured to calculate, for each of the at least two segments, an amount of energy to be provided to the electric motor such that an energy threshold of the energy storage is maintained for the at least two segments under consideration of the environmental value and the currently available charge of the energy storage, wherein the energy calculation unit is further configured to calculate, for each of the at least two segments, an assistance factor based on the calculated amount of energy.

The device further comprises an energy providing unit configured to provide energy to the electric motor during the first segment according to the calculated assistance factor, wherein the energy-determining unit is further configured to determine the currently available charge of the energy storage at the current location after the first segment.

The device further comprises a comparison unit configured to compare an amount of energy consumed during the first segment with the calculated amount of energy for the first segment, a storage unit configured to store a deviation from a predetermined deviation threshold in a correction value if the comparison from the comparison unit exceeds the predetermined deviation threshold, wherein the calculation unit is further configured to recalculate the amount of energy to be provided to the electric motor such that an energy threshold of the energy storage is maintained for the second segment under consideration of the environmental value, the currently available charge of the energy storage and the correction value and wherein the energy calculation unit is further configured to recalculate, for each of the at least two segments, an assistance factor based on the recalculated amount of energy and wherein the energy providing unit is further configured to provide energy to the electric motor during the second segment according to the recalculated assistance factor.

The device can be improved in that the user interface is configured to provide a user threshold request to the user to define the energy threshold of the energy storage, receive user threshold input in response to the user threshold request on the user interface and apply the user threshold input to the energy threshold.

The device can be further improved in that the user interface is configured to provide a user segment request to a user to define the at least two segments, receive user segment input in response to the user segment request and apply the user segment input to the at least two segments.

The device can be further improved in that the route-calculation unit is configured to calculate two alternative routes and wherein the user interface is configured to provide a user route request to a user to select a route out of the two alternative routes, receive user route input in response to the user route request and apply the user route input to the route.

The device can be further improved by comprising a user-determination unit configured to determine a user value indicating at least one condition of the user and wherein the calculation unit is further configured to recalculate the amount of energy to be provided to the electric motor under consideration of the user value.

The device can be further improved by comprising a bicycle-determination unit configured to determine a bicycle value indicating at least one condition of the bicycle and wherein the calculation unit is further configured to recalculate the amount of energy to be provided to the electric motor under consideration of the bicycle value.

The device can be further improved by comprising a battery-determination unit configured to determine a batter value indicating at least one condition of the energy storage and wherein the calculation unit is further configured to recalculate the amount of energy to be provided to the electric motor under consideration of the battery value.

The device can be further improved in that the storage unit is further configured to store the user value and/or the bicycle value and/or the battery value in the correction value.

According to a further aspect, an electrically-assisted bicycle is provided, comprising an energy storage, an electric motor and a device according to one of the previous embodiments.

With regard to the advantages of the device and the electrically-assisted vehicle reference is made to the advantages of the method.

Embodiments of the invention will now be described with reference to the attached drawings, in which FIG. 1 schematically shows an example of electrically-assisted bicycle according to an embodiment;

FIG. 4 is a block diagram showing a device for dynamically controlling a range of an electrically-assisted bicycle according to an embodiment.

Figure 1:
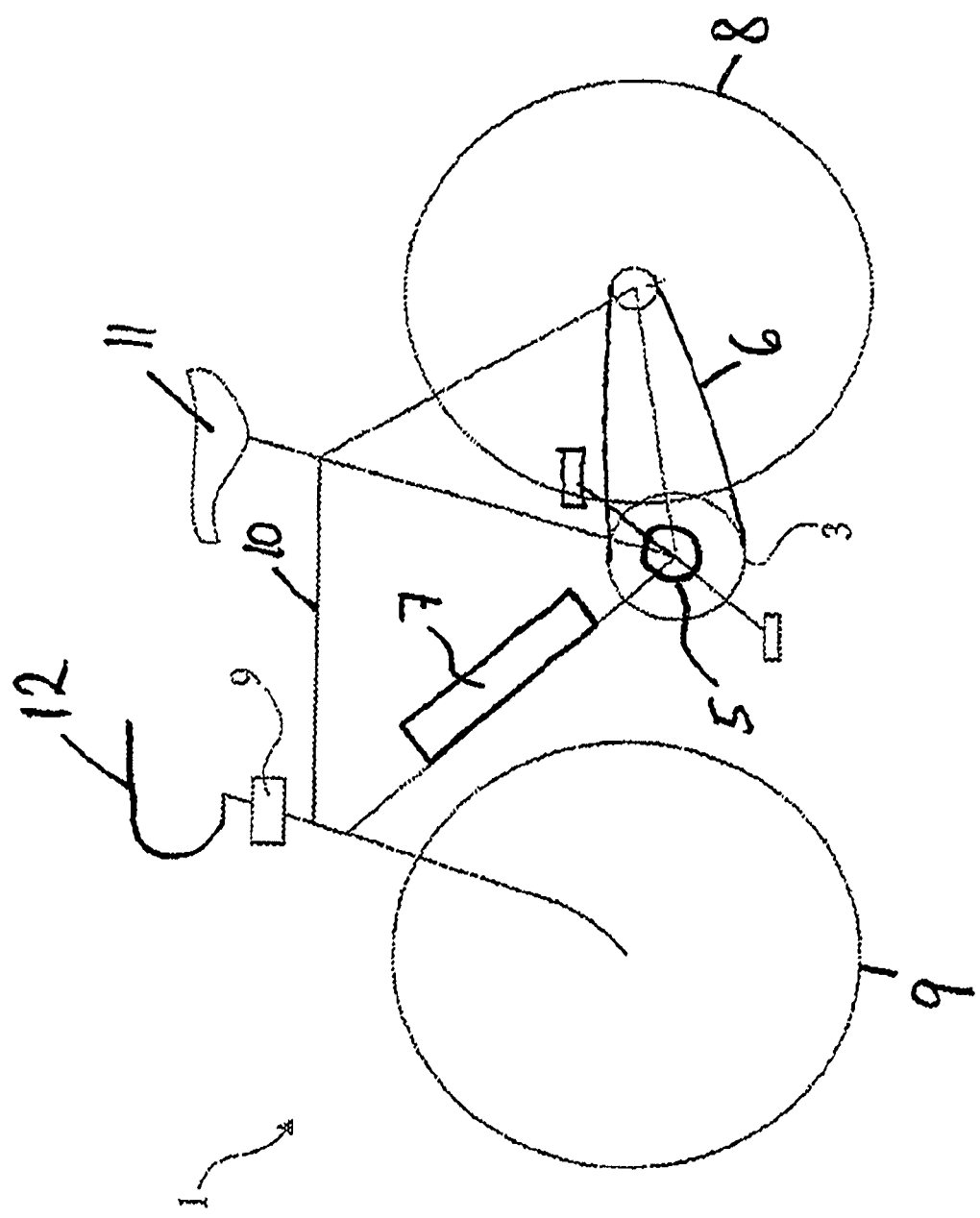

FIG. 1 schematically shows an electrically-assisted bicycle 1. The electrically-assisted bicycle 1 comprises a frame 10, a front wheel 9, a saddle 11, a handle 12 and a crank gear 3, connected to a back wheel 8 via a chain 6 and toothed wheels (not shown). Bicycle 1 further comprises an electrical motor 5 to assist the driver during pedalling, which is electrically powered by an energy storage 7, like a battery.

Electric motor 5 is arranged so that, in operation, it rotates the back wheel 8 to assist a driver's pedalling. There exist variations where the assistance motor can be arranged to drive the crank gear, the front hub, or the actual wheel, for example, via a friction roller. In the shown example, battery 7 is located in a centre section of the frame 10.

The bicycle 1 further comprises a device 9 for dynamically controlling the range of an electrically-assisted bicycle. The device 9 has the form of a touch interface and comprises a location determining unit configured to determine a current bicycle location, a target determining unit configured to determine a target location, a route calculation unit configured to calculate a route from the current bicycle location to the target location and a user interface configured to display information to a user.

The device 9 further comprises an energy determining unit configured to determine a currently available charge of the energy storage at the current location, an environment determining unit configured to determine an environmental value indicating at least one environmental condition for the calculated route and a segment unit configured to divide the calculated route into at least two segments.

The device 9 further comprises an energy calculation unit configured to calculate, for each of the at least two segments, an amount of energy to be provided to the electric motor such that an energy threshold of the energy storage is maintained for the entire route under consideration of the environmental value and the currently available charge of the energy storage, wherein the energy calculation unit is further configured to calculate, for each of the at least two segments, an assistance factor based on the calculated amount of energy.

The device 9 further comprises an energy providing unit configured to provide energy to the electric motor during the first segment according to the calculated assistance factor, wherein the energy-determining unit is further configured to determine the currently available charge of the energy storage at the current location after the first segment, a comparison unit configured to compare an amount of energy consumed during the first segment with the calculated amount of energy for the first segment, The device 9 further comprises a storage unit configured to store a deviation from a predetermined deviation threshold in a correction value if the comparison from the comparison unit exceeds the predetermined deviation threshold, wherein the calculation unit is further configured to recalculate the amount of energy to be provided to the electric motor such that an energy threshold of the energy storage is maintained for the second segment under consideration of the environmental value, the currently available charge of the energy storage and the correction value.

The energy calculation unit is further configured to recalculate, for each of the at least two segments, an assistance factor based on the recalculated amount of energy and wherein the energy providing unit is further configured to provide energy to the electric motor during the second segment according to the recalculated assistance factor.

Therein, the location determining unit, the target determining unit, the route calculation unit, the energy determining unit, the environment determining unit, the segment unit, the energy calculation unit, the energy providing unit, the comparison unit and the storage unit are embodied in a microprocessor system having access to a memory, a GPS sensor, the touch screen and a database. The device is further described in detail in FIG. 4.

Figure 2:
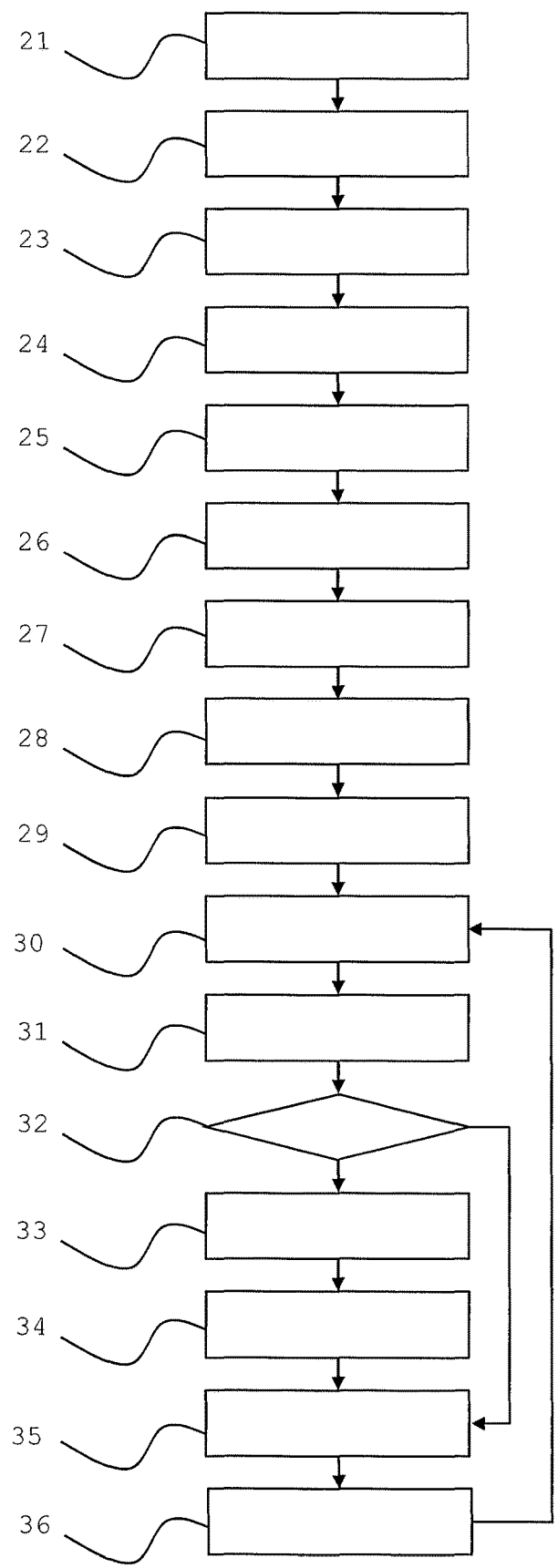
FIG. 2 is a flow chart diagram schematically showing steps of a method for dynamically controlling a range of an electrically-assisted bicycle according to an embodiment.

FIG. 2 is a flow chart diagram schematically showing steps of a method for dynamically controlling a range of an electrically-assisted bicycle, the bicycle comprising an energy storage and an electric motor. The method is carried out by a device for dynamically controlling a range of an electrically-assisted bicycle comprising a touch screen user interface.

In a first step 21, the current location of the bicycle is determined by using a GPS sensor. The location can be displayed on the user interface, for example on a rendered map of the surrounding location.

In a second step 22, a target location is determined by receiving a target location address or coordinates from a user through the user interface, which can also be displayed in the user interface.

The steps 21 and 22 can also be performed the other way around, i.e. step 22 before 21. Important for step 23 is that the current location, i.e. the starting point of the route and the target location, i.e. the finish point of the route are determined.

In the following step 23, optionally after a user confirmation of the current location and/or the target location, a route from the current bicycle location to the target location is calculated by using map data being stored in a map database. If there is more than one route option from the current location to the target location, then more than one route is calculated. The route or routes can then subsequently be displayed on the user interface. If there are two routes calculated, there can be provided a user route request to a user to select a route out of the two alternative routes on the user interface and subsequently a user route input is received from the user in response. The selected route is then used as the route in the following steps.

In a next step 24, the currently available charge of the energy storage at the current location is determined. This charge can also be displayed, for example in Ah or in a corresponding value in Wh, on the user interface. Within this step or subsequently, there can be provided a user threshold request to the user to define an energy threshold of the energy storage and subsequently, a user threshold input is received. This user threshold input is the used as the energy threshold in the subsequent steps.

In the following step 25, an environmental value indicating at least one environmental condition for the calculated route is determined. The environmental value and/or condition can also be displayed on the user interface. For example, if there is a total slope over the whole route, this might be displayed in climbing meters. In another example, if there is a continuous headwind of 10 m/s, this might as well be displayed on the user interface.

In a next step 26, the calculated route is divided into at least two segments. The segments can optionally be displayed on the user interface together with the calculated route. There can be provided a user segment request to the user to define the at least two segments on the user interface and subsequently a user segment input is received from the user in response. The defined segments are then used as the segments in the following steps.

During, between or after the steps 21 to 26, there can be determined a user value indicating at least one condition of the user, a bicycle value indicating at least one condition of the bicycle and a battery value indicating at least one condition of the energy storage.

The steps 23 to 26 can be carried out simultaneously or in a different order. For example, it is possible that first step 24 is carried out, then step 23 and thereafter steps 25 and 26. In another example, step 23 is carried out first, the step 25 and thereafter 24 and 26. In a further example, the order of the steps is 23, 26, 25 and 24. It is only important before continuing with step 27 that all parameters of the whole route, i.e. the route itself, the available energy charge at least one environmental condition, the segments and further factors, such as user value, bicycle value and battery value are determined.

In a further step 27, an amount of energy to be provided to the electric motor is calculated for each of the at least two segments, such that a predefined or user-defined energy threshold of the energy storage is maintained for the at least two segments under consideration of the environmental value and the currently available charge of the energy storage. Further values, such as user value, bicycle value and battery value may also be taken into account. Additionally, a previously determined correction value may also be taken into account. The amount of energy as well as all considered values and factors can be displayed on the user interface for each of the segments.

Then, based on the calculated amount of energy from step 27 an assistance factor is calculated for each of the at least two segments in a following step 28.

All above steps 21 to 28 should be performed before starting to travel along the route or at least at a very early stage of the first segment. All above steps 21 to 28 can be started after a user start input, either individually or as a whole.

In a next step 29, energy is provided to the electric motor during the first segment according to the calculated assistance factor. Therein, the energy provided to the electric motor is provided in addition to the human muscle power provided by the user of the bicycle. During the travel along the first segment, the current position can continuously be monitored, for example through the GPS sensor, and thus the advancement through the first segment can be monitored.

After completion the first segment in a further step 30 the currently available charge of the energy storage at the current location is determined or redetermined, by the same means as in above step 24.

In a further step 31 an amount of energy consumed during the first segment is compared with the calculated amount of energy during the first segment. In a decision 32, it is decided whether the comparison exceeds a predetermined deviation threshold. If yes, the step 33 of storing the deviation in a correction value is performed.

Then, in a further step 34, the amount of energy to be provided to the electric motor is recalculated such that an energy threshold of the energy storage is maintained for the second segment under consideration of the environmental value, the currently available charge of the energy storage and the correction value.

In a further step 35 the assistance factor is recalculated for the second segment based on the recalculated amount of energy.

In another step 36, energy to the electric motor during the second segment is provided according to the recalculated assistance factor.

If the route has more than two segments, the method can return to step 24 for every following segment and re-perform the previously described steps 30 to 36.

If at decision 32, the comparison does not exceed a predetermined deviation threshold, energy is provided to the electric motor during the second segment in step 36 according to the correction factor as previously calculated in step 28.

The determination of the currently available charge of the energy storage in steps 24 and/or 30 can be performed through a voltage measurement or through a balance measurement or through the combination of both measurements, as described above. For example, it is possible perform a voltage measurement for a nearly fully charged energy storage, at for example 90% charge, and to perform a balance measurement for a partially discharged energy storage, at for example 60%. Additionally, the measurements can be applied at the same time, for example in step 24 and/or step 30. Then, it is possible to use both measurements together to achieve a more precise value for the currently available charge of the energy storage.

Further, these two measurements, i.e. the voltage measurement and the balance measurement, can be used to calculate an average value. This average value can further be based on a weighting factor for each of the measurements, depending on one or more conditions of the energy storage, such as currently determined charge, temperature, age, deterioration or the like.

For example, if the measurement yields that the charge is in an estimated mid-range, i.e. not fully charged and not fully discharge, such as 60%, the voltage measurement can have a higher weighting as the balance measurement, such as 0.55, as the voltage measurement is more precise for such a charge. If the measurement yields that the charge is close to fully charged, such as 90%, the balance measurement can have a higher weighting as the voltage measurement, such as 0.55, as the balance measurement is more precise for such a charge.

Further, this weighting can be adapted based on multiple measurements over the time, wherein the weighting is also based on previous voltage and balance measurements. Additionally, or alternatively, the measurements can also be weighted by taking into account the measurement uncertainty of the individual measurement. For example, the voltage measurement yields 500 mAh and is known to have a measurement uncertainty of 10% in that particular charge range. At the same the balance measurement yields 510 mAh and is known to have a measurement uncertainty of 5% in the same particular charge range. Then, by taking all these factors into account, the currently available charge can, for example, yield ((500 mAh/10%)+510 mAh/5%)/((1/10%)+(1/5%))=506.7 mAh.

Figure 3:
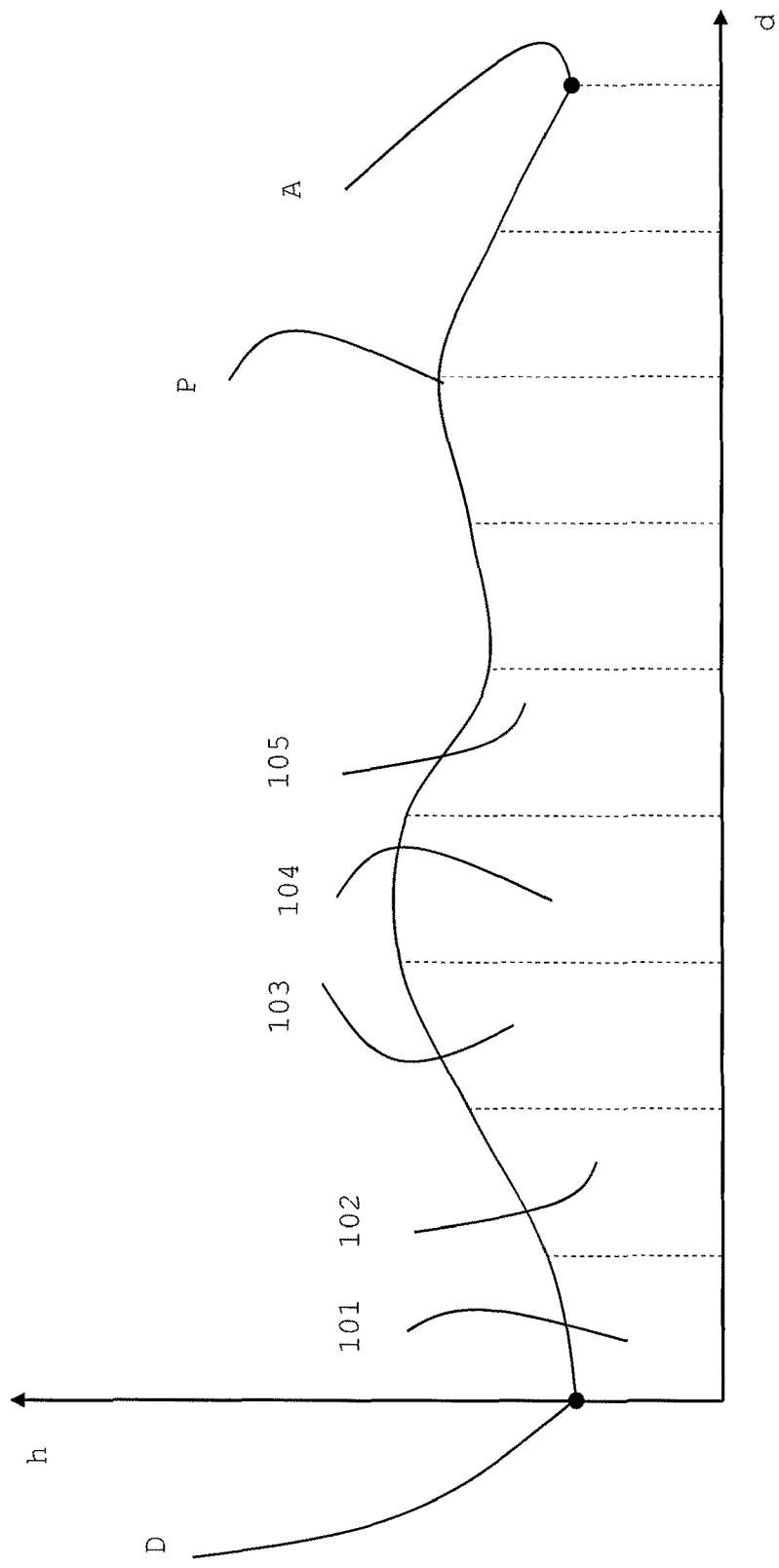
FIG. 3 illustrates an example of data being calculated and recalculated in a method for dynamically controlling a range of an electrically-assisted bicycle according to an embodiment.

FIG. 3 illustrates an example of data being calculated and recalculated in a method for dynamically controlling a range of an electrically-assisted bicycle according to an embodiment. It shows the height h, which is an environmental value or a set of environmental values, as a function of distance d between a starting point D and an arrival point A of the route a user of an electrically-assisted bicycle desires to travel. The route is calculated on the starting point D under consideration of the environmental value and a currently available charge of the energy storage such that an energy threshold of the energy storage is maintained for the entire route.

Therefore, the route has been divided into multiple equally long segments, in this example eight, out of which the first five segments are provided with reference numerals only due to visibility reasons. When calculating the route, it has been determined that the total available energy in the energy storage would be 1000 Wh for the entire route. The energy threshold might be, for example set by the user through a user interface, 200 Wh. Thus, the total energy to be provided to an electric motor of the electrically-assisted bicycle would be 800 Wh. If the energy would be equally distributed across the eight segments, then the energy to be provided to the electric motor would be 100 Wh for each of the eight segments. This is however not desirable as for segments with a negative slope there will be energy wasted as there is no need to provide energy and consequently there will be less energy available for the segments with a positive slope to go up the hill.

Now taking into account the height profile P as a set of environmental values along the route, a specific amount of energy can be calculated for each segment to be provided to the electric motor. For example, in the first segment 101, the calculated energy to be provided can be 110 Wh, due to the slight slope. In the second segment 102, it can be 150 Wh, in the third segment 103 it can be 140 Wh and in the fourth segment 104 it can be 90 Wh. In the fifth segment 105, the energy to be provided to the electric Motor can be zero or even negative, if the electrically-assisted bicycle comprises an energy-recuperation device, for example to regenerate energy from braking due to the downhill slope. While this is more desirable than a constant energy distribution, this calculation does not take into account unforeseeable or unknown circumstances of the travel along the route. Further, calculated amount of energy can only be a target, since it is not possible to control exactly which amount of energy will have been provided to the electric motor at the end of a segment, for example, providing further energy into the electric motor could be prevented if a user provides a surprisingly high, unexpected amount of human muscle power to the bicycle, thus reaching the end of the segment before the energy amount can be provided to the electric motor. Conversely, an amount of energy may not suffice to reach the end of a segment, for example if the bicycle is surprisingly braked, wherein the kinetic energy of the bicycle is partly converted into heat dissipating in the brakes.

Therefore, after completing the first segment 101, the currently available energy is redetermined and compared with the energy that has been calculated to be provided during the first segment. If the calculated amount of energy has been provided to the electric motor during that segment as calculated, the next segment is approached in the same way as before. If, however, a higher amount of electric energy has been provided to the electric motor than calculated, two corrections are undertaken. For one, the total energy to be provided to the electric motor of the electrically-assisted bicycle is less than anticipated, thus the energy which has to be provided to the electric motor for each segment is recalculated. Secondly, the correction value is lowered, such that the energy provided to the electric motor in the next segment is more likely to correspond to the energy recalculated to be provided to the electric motor for the next segment. Therefore, a lower assistance factor is applied to the electric motor of the electric bicycle in the next segment compared to what would have been applied without the correction factor. Similarly, if a lower amount of electric energy has been provided to the electric motor than calculated, the energy to be provided to the electric motor for the following segments is recalculated according to the higher total energy remaining to be provided to the electric motor, and the correction value is increased, such that the energy provided to the electric motor during the next segment or segments is more likely to correspond to the energy as recalculated to be provided to the electric motor in the next segment or segments. Therefore, a higher assistance factor is applied to the electric motor of the electric bicycle in the next segment compared to what would have been applied without the correction factor.

FIG. 4 shows a block diagram showing a device 40 for dynamically controlling a range of an electrically-assisted bicycle comprising an energy storage and an electric motor 51. The device comprises a processor 41, that has access to an array of sensors 42, a memory 43 and an I/O module 44. The processor 41 is also connected with the electric motor 51 of the bicycle.

The array of sensors 42 comprises a GPS sensor 45 to determine a current location of the bicycle, a weight sensor 46 to determine the weight of the user of the bicycle, a tire pressure sensor 47 to determine a tire pressure a voltage sensor 48 to determine a currently available charge of the energy storage 51, a speed sensor 49 to determine a current speed of the bicycle and a power sensor 50 to determine the current power being applied at the crank by the user pedalling the bicycle. The array of sensors 42 can also comprise a temperature sensor, which is not shown in FIG. 4.

The memory 43 comprises several databases: a map database 52, comprising map data, an environmental database 53, comprising environmental conditions, a user database 54, comprising user conditions, a bicycle database 55, comprising bicycle conditions, a correction database 56, comprising correction values, an assistance factor database 57 comprising assistance factors and a battery database (not shown) comprising energy storage conditions.

The I/O module 44 comprises a touchscreen 58 forming a user interface and a communication module 59 being able to communicate the device with a remote device, for example through a mobile or Wi-Fi connection. Through the touchscreen 58, the user is able to enter and receive information, such as data, values and conditions into respectively from the device 41.

The processor 41 forms a location determining unit configured to determine a current bicycle location by receiving accessing the GPS sensor 45, a target determining unit configured to determine a target location by receiving a user input from the touchscreen 58 and a route calculation unit configured to calculate a route from the current bicycle location to the target location by accessing the map database 52. All databases can be exchanged and/or updated with a remote device, such, for example a remote server through the communication module 59.

The processor 41 further forms an energy determining unit configured to determine a currently available charge of the energy storage at the current location by accessing the voltage sensor 48, an environment determining unit configured to determine an environmental value indicating at least one environmental condition for the calculated route by accessing the environmental database 53 and a segment unit configured to divide the calculated route into at least two segments.

The processor 41 further forms an energy calculation unit configured to calculate, for each of the at least two segments, an amount of energy to be provided to the electric motor such that an energy threshold of the energy storage is maintained for the entire route under consideration of the environmental value and the currently available charge of the energy storage, wherein the energy calculation unit is further configured to calculate, for each of the at least two segments, an assistance factor based on the calculated amount of energy. This assistance factor is stored in the assistance factor database 57.

The processor 41 further forms an energy providing unit configured to provide energy to the electric motor 50 during the first segment according to the calculated assistance factor taking into account the power the user applies to the crank received from power sensor 50. The energy determining unit of the processor 41 is further configured to determine the currently available charge of the energy storage at the current location after the first segment.

The processor 41 further forms a comparison unit configured to compare an amount of energy consumed during the first segment with the calculated amount of energy for the first segment and a storage unit configured to store a deviation from a predetermined deviation threshold in a correction value if the comparison from the comparison unit exceeds the predetermined deviation threshold by accessing the correction database 56.

The energy calculation unit of the processor 41 therein is further configured to recalculate the amount of energy to be provided to the electric motor such that an energy threshold of the energy storage is maintained for the second segment under consideration of the environmental value, the currently available charge of the energy storage and the correction value and wherein the energy calculation unit is further configured to recalculate, for each of the at least two segments, an assistance factor based on the recalculated amount of energy.

The energy providing unit of the processor 41 is further configured to provide energy to the electric motor 50 during the second segment according to the recalculated assistance factor.

When calculating and recalculating the amount of energy to be provided to the electric motor, the processor also considers various other factors and values being stored in the databases, for example from the user database 54 and the bicycle database 55, wherein a user value in the user database 54 has been received from the weight sensor 46, the bicycle value in the bicycle database 55 has been received from the tire pressure sensor 47.

LIST OF REFERENCE NUMERALS

1 electrically-assisted bicycle
3 crank gear
5 electrical motor
6 chain
7 energy storage
8 back wheel
9 front wheel
10 frame
11 saddle
12 handle
21 method step
22 method step
23 method step
24 method step
25 method step
26 method step
27 method step
28 method step
29 method step
30 method step
31 method step
32 decision
33 method step
34 method step
35 method step
36 method step
40 device for dynamically controlling a range of an electrically-assisted bicycle
41 processor
42 array of sensors
43 memory
44 I/O module
45 GPS sensor
46 weight sensor
47 tire pressure sensor
48 voltage sensor
49 speed sensor
50 power sensor
51 energy storage
52 map database
53 environmental database
54 user database
55 bicycle database
56 correction database
57 assistance factor database
58 touchscreen
59 communication module
101 first segment
102 second segment
103 third segment
104 fourth segment
105 fifth segment
A arrival point
d distance
D starting point
h height
P height profile

The invention claimed is:

1. A method for dynamically controlling a range of an electrically-assisted bicycle comprising an energy storage and an electric motor, the method comprising the steps of:
   determining a current bicycle location;
   determining a target location;
   calculating a route from the current bicycle location to the target location;
   determining currently available charge of the energy storage at the current location;
   determining an environmental value indicating at least one environmental condition for the calculated route;
   dividing the calculated route into at least two segments;
   calculating, for each of the at least two segments, an amount of energy to be provided to the electric motor such that an energy threshold of the energy storage is maintained for the at least two segments under consideration of the environmental value and the currently available charge of the energy storage;
   calculating, for each of the at least two segments, an assistance factor based on the calculated amount of energy;
   providing energy to the electric motor during a first segment of the at least two segments according to the calculated assistance factor;
   after completing the first segment, determining the currently available charge of the energy storage at the current location;
   comparing an amount of energy consumed during the first segment with the calculated amount of energy during the first segment;
   if the comparison exceeds a predetermined deviation threshold, storing the deviation in a correction value;
   recalculating the amount of energy to be provided to the electric motor such that an energy threshold of the energy storage is maintained for a second segment of the at least two segments under consideration of the environmental value, the currently available charge of the energy storage and the correction value;
   recalculating the assistance factor based on the recalculated amount of energy for the second segment; and
   providing energy to the electric motor during the second segment according to the recalculated assistance factor.

2. The method according to claim 1, further comprising the steps of:
   providing a user threshold request to a user to define the energy threshold of the energy storage, which equals to a desired remaining energy after finishing the at least two segments;
   receiving user threshold input in response to the user threshold request; and
   applying the user threshold input to the energy threshold.

3. The method according to claim 1, further comprising the steps of:
   providing a user segment request to a user to define the at least two segments;
   receiving user segment input in response to the user segment request; and
   applying the user segment input to the at least two segments.

4. The method according to claim 1, wherein the step of calculating a route comprises calculating two alternative routes and wherein the method further comprises the steps of:
   providing a user route request to a user to select a route out of the two alternative routes;

receiving user route input in response to the user route request; and applying the user route input to the route.

5. The method according to claim 1, further comprising the step of determining a user value indicating at least one condition of the user and wherein the steps of recalculating the amount of energy to be provided to the electric motor also comprises recalculating the amount of energy to be provided to the electric motor under consideration of the user value.

6. The method according to claim 1, further comprising the step of determining a bicycle value indicating at least one condition of the bicycle and wherein the steps of recalculating the amount of energy to be provided to the electric motor also comprises recalculating the amount of energy to be provided to the electric motor under consideration of the bicycle value.

7. A device for dynamically controlling a range of an electrically-assisted bicycle comprising an energy storage and an electric motor, the device comprising:
- a location determining unit configured to determine a current bicycle location;
- a target determining unit configured to determine a target location;
- a route calculation unit configured to calculate a route from the current bicycle location to the target location;
- a user interface configured to display information to a user;
- an energy determining unit configured to determine a currently available charge of the energy storage at the current location;
- an environment determining unit configured to determine an environmental value indicating at least one environmental condition for the calculated route;
- a segment unit configured to divide the calculated route into at least two segments;
- an energy calculation unit configured to calculate, for each of the at least two segments, an amount of energy to be provided to the electric motor such that an energy threshold of the energy storage is maintained for the at least two segments under consideration of the environmental value and the currently available charge of the energy storage wherein the energy calculation unit is further configured to calculate, for each of the at least two segments, an assistance factor based on the calculated amount of energy;
- an energy providing unit configured to provide energy to the electric motor during a first segment of the at least two segments according to the calculated assistance factor, wherein the energy determining unit is further configured to determine the currently available charge of the energy storage at the current location after the first segment;
- a comparison unit configured to compare an amount of energy consumed during the first segment with the calculated amount of energy for the first segment; and
- a storage unit configured to store a deviation from a predetermined deviation threshold in a correction value if the comparison from the comparison unit exceeds the predetermined deviation threshold, wherein the energy calculation unit is further configured to recalculate the amount of energy to be provided to the electric motor such that an energy threshold of the energy storage is maintained for a second segment of the at least two segments under consideration of the environmental value, the currently available charge of the energy storage and the correction value and wherein the energy calculation unit is further configured to recalculate, for each of the at least two segments, an assistance factor based on the recalculated amount of energy, and wherein the energy providing unit is further configured to provide energy to the electric motor during the second segment according to the recalculated assistance factor.

8. The device according to claim 7, wherein the user interface is configured to:
- provide a user threshold request to the user to define the energy threshold of the energy storage;
- receive user threshold input in response to the user threshold request on the user interface; and
- apply the user threshold input to the energy threshold.

9. The device according to claim 7, wherein the user interface is configured to:
- provide a user segment request to a user to define the at least two segments;
- receive user segment input in response to the user segment request; and
- apply the user segment input to the at least two segments.

10. The device according to claim 7, wherein the route calculation unit is configured to calculate two alternative routes and wherein the user interface is configured to:
- provide a user route request to a user to select a route out of the two alternative routes;
- receive user route input in response to the user route request; and
- apply the user route input to the route.

11. The device according to claim 7, further comprising a user-determination unit configured to determine a user value indicating at least one condition of the user and wherein the calculation unit is further configured to recalculate the amount of energy to be provided to the electric motor under consideration of the user value.

12. The device according to claim 7, further comprising a bicycle-determination unit configured to determine a bicycle value indicating at least one condition of the bicycle and wherein the calculation unit is further configured to recalculate the amount of energy to be provided to the electric motor under consideration of the bicycle value.

13. The device according to claim 7, further comprising a battery-determination unit configured to determine a battery value indicating at least one condition of the energy storage and wherein the calculation unit is further configured to recalculate the amount of energy to be provided to the electric motor under consideration of the battery value.

14. The device according to claim 13, wherein the storage unit is further configured to store one or more of the user value, the bicycle value, and the battery value in the correction value.

15. An electrically-assisted bicycle comprising:
- an energy storage;
- an electric motor;
- a user interface configured to display information to a user; and
- a device comprising
  - a location determining unit configured to determine a current bicycle location,
  - a target determining unit configured to determine a target location,
  - a route calculation unit configured to calculate a route from the current bicycle location to the target location,
  - an energy determining unit configured to determine a currently available charge of the energy storage at the current location, an environment determining unit configured to determine an environmental value indicating at least one environmental condition for the calculated route, a segment unit configured to divide the calculated route into at least two segments, an energy calculation unit configured to calculate, for each of the at least two segments, an amount of energy to be provided to the electric motor such that an energy threshold of the energy storage is maintained for the at least two segments under consideration of the environmental value and the currently available charge of the energy storage, wherein the energy calculation unit is further configured to calculate, for each of the at least two segments, an assistance factor based on the calculated amount of energy, an energy providing unit configured to provide energy to the electric motor during a first segment of the at least two segments according to the calculated assistance factor, wherein the energy determining unit is further configured to determine the currently available charge of the energy storage at the current location after the first segment, a comparison unit configured to compare an amount of energy consumed during the first segment with the calculated amount of energy for the first segment, and a storage unit configured to store a deviation from a predetermined deviation threshold in a correction value if the comparison from the comparison unit exceeds the predetermined deviation threshold, wherein the energy calculation unit is further configured to recalculate the amount of energy to be provided to the electric motor such that an energy threshold of the energy storage is maintained for a second segment of the at least two segments under consideration of the environmental value, the currently available charge of the energy storage and the correction value and wherein the energy calculation unit is further configured to re calculate, for each of the at least two segments, an assistance factor based on the recalculated amount of energy, and wherein the energy providing unit is further configured to provide energy to the electric motor during the second segment according to the recalculated assistance factor.

16. The electrically-assisted bicycle according to claim 15, wherein the user interface is further configured to:

provide a user threshold request to the user to define the energy threshold of the energy storage;

receive user threshold input in response to the user threshold request on the user interface; and apply the user threshold input to the energy threshold.

17. The electrically-assisted bicycle according to claim 15, wherein the user interface is further configured to:

provide a user segment request to a user to define the at least two segments;

receive user segment input in response to the user segment request; and apply the user segment input to the at least two segments.

18. The electrically-assisted bicycle according to claim 15, wherein the route calculation unit of the device is configured to calculate two alternative routes and wherein the user interface is further configured to:

provide a user route request to a user to select a route out of the two alternative routes;

receive user route input in response to the user route request; and apply the user route input to the route.

19. The electrically-assisted bicycle according to claim 15, wherein the device further comprises a user-determination unit configured to determine a user value indicating at least one condition of the user and wherein the calculation unit is further configured to recalculate the amount of energy to be provided to the electric motor under consideration of the user value.

20. The electrically-assisted bicycle according to claim 15, wherein the device further comprises a bicycle-determination unit configured to determine a bicycle value indicating at least one condition of the bicycle and wherein the calculation unit is further configured to recalculate the amount of energy to be provided to the electric motor under consideration of the bicycle value.

* * * * *